Patented Dec. 30, 1941

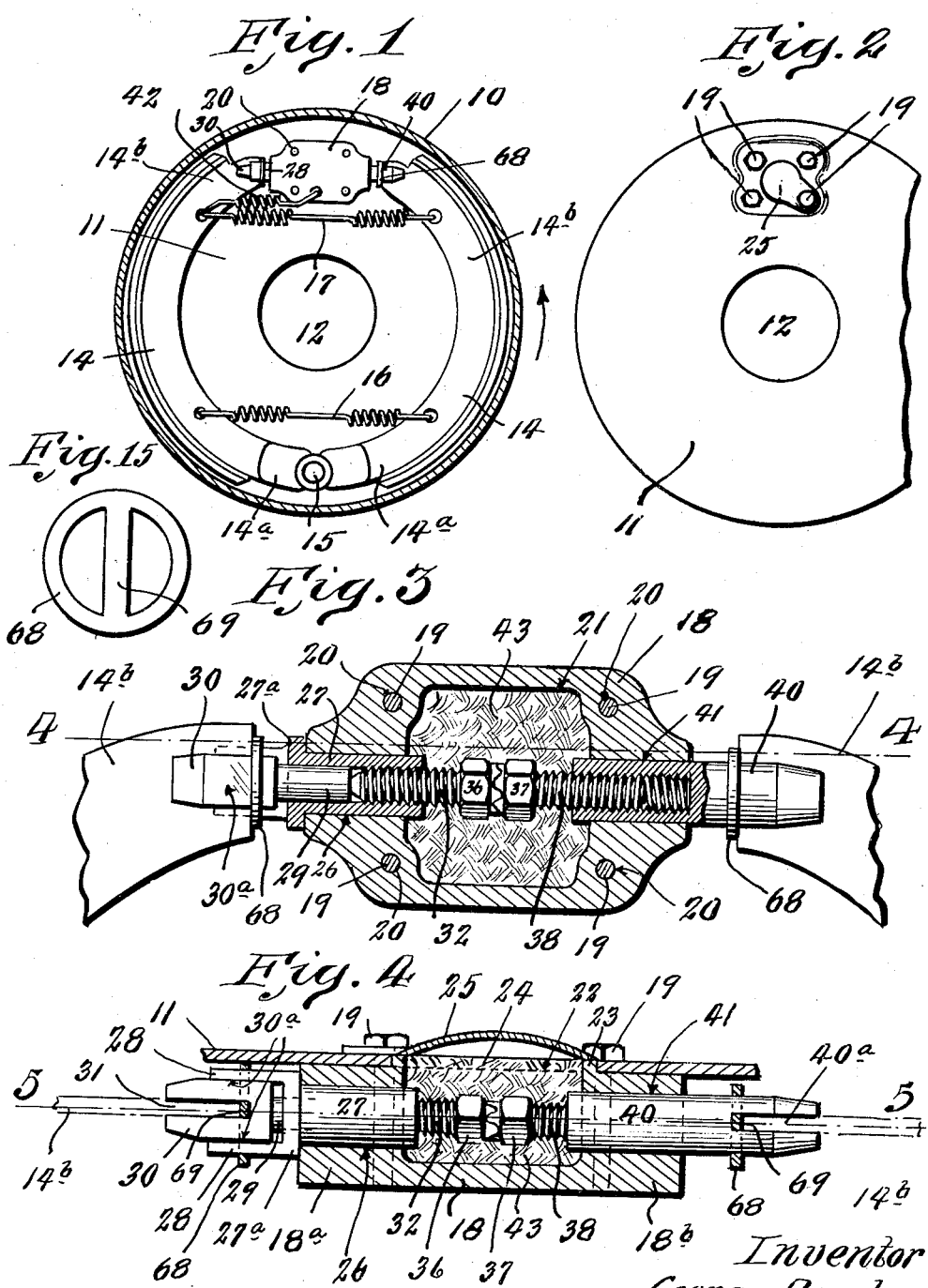

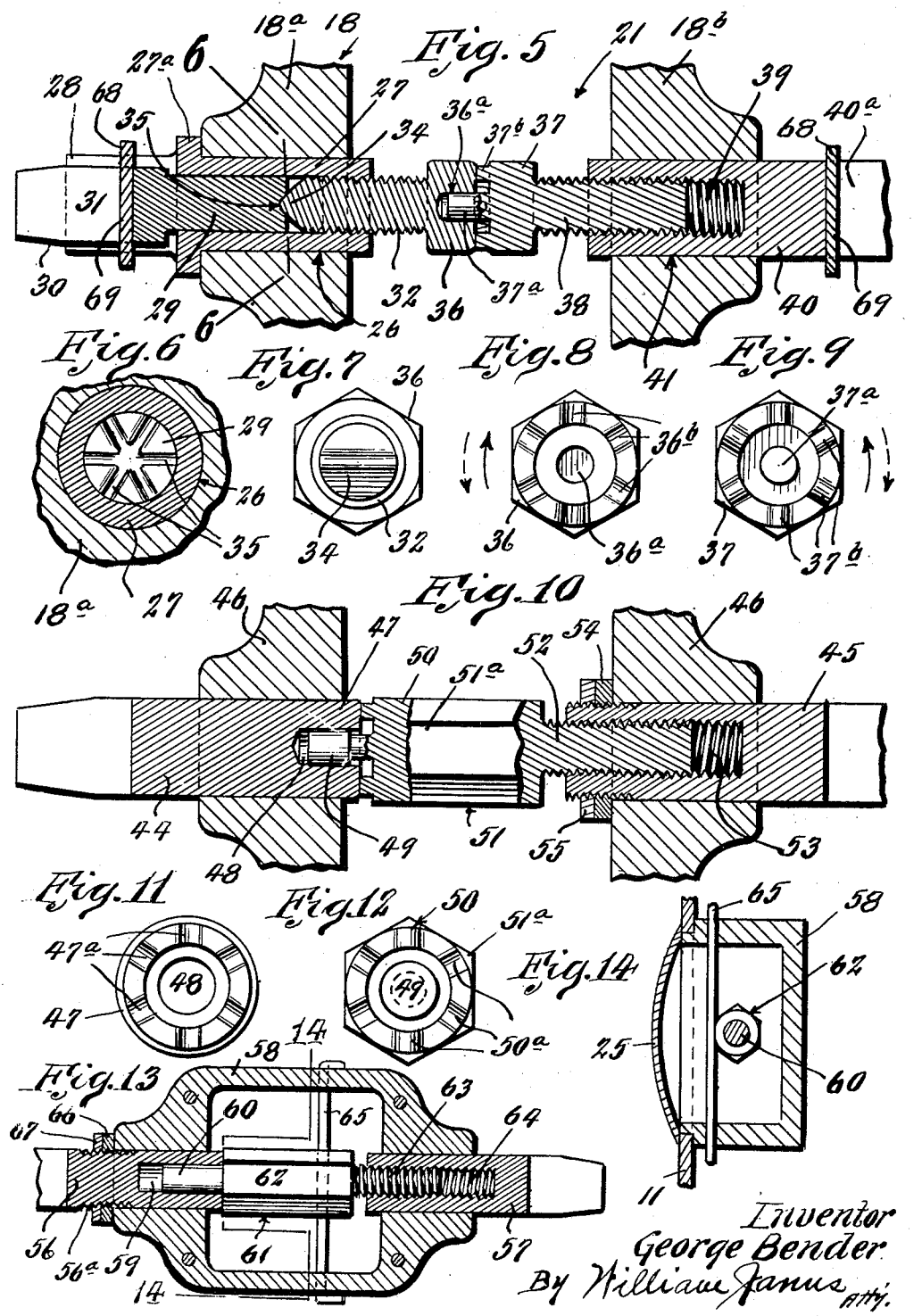

2,268,275

UNITED STATES PATENT OFFICE 2,268,275

ADJUSTING MECHANISM FOR AUTOMOBILE BRAKE SHOES

George Bender, Oklahoma City, Okla.

Application August 4, 1940, Serial No. 351,380

10 Claims. (Cl. 188—79.5)

This invention relates to new and useful improvements in brake shoe adjusting mechanisms for automobiles.

Among the main objects of the invention is the provision of a mechanism which is simple to install, which increases the braking efficiency, and prolongs the life of the brake lining, and which can be easily adjusted and does not require special tools.

Another object of the invention is to provide an adjusting mechanism for brake shoes which is accurate and efficient in operation, provides smooth braking operation, and which energizes both brake shoes in forward and reverse operations and insures even wear on both brake shoes.

Another object of the invention is to provide an adjusting mechanism for brake shoes which is enclosed in a box or housing to protect it from mud and sand and ice and to maintain it lubricated at all times.

Still another object of the invention is to provide a brake shoe adjusting mechanism which can be easily and quickly installed, does not require drilling or other machine operations, and can be applied to brake mechanisms of the type now in use.

With these and other objects in view, my invention consists in certain novel features of construction and arrangement of parts, hereinafter more fully described and claimed, and illustrated in the accompanying drawings, in which—

Figure 1 is a front elevation of the braking plate and the brake shoe mechanism mounted thereon.

Figure 2 is a rear elevational view thereof.

Figure 3 is an enlarged cross section taken longitudinally and vertically through the adjusting mechanism.

Figure 4 is a cross section taken on line 4—4 of Figure 3.

Figure 5 is an enlarged cross section taken on line 5—5 of Figure 4.

Figure 6 is a vertical cross section taken on line 6—6 of Figure 5.

Figure 7 is an enlarged end view of the front adjusting screws.

Figure 8 is an enlarged end view of the head of said adjusting screw.

Figure 9 is an enlarged end view of the head of the other adjusting screw.

Figure 10 is an enlarged longitudinal and vertical cross section through a modified form of my adjusting mechanism.

Figure 11 is an enlarged end view of the inner end of the front brake shoe adjusting member.

Figure 12 is an enlarged end view of the adjusting screw.

Figure 13 is a vertical and longitudinal cross section of another modified form of my adjusting mechanism.

Figure 14 is a vertical cross section taken on line 14—14 of Figure 13.

Figure 15 is an elevation of one of the brake shoe washers.

Referring by numerals to the accompanying drawings, 10 indicates the annular flange of a brake drum and 11 the braking plate or flange on which the brake shoes and the adjusting mechanism are mounted.

This plate has a central opening 12. A pair of brake shoes 14 is arranged to operate against the internal surface of flange 10. These brake shoes are operatively associated at one of their ends, the lower ends 14a, in the present instance, with an actuating member 15 of a brake operating mechanism. A return brake shoe spring 16 is arranged to one side of central opening 12 and extends between the brake shoes 14 and is connected at its ends to the respective brake shoes near said ends 14a. A similar coiled spring 17 is arranged on the opposite side of said opening 12 and is connected at its ends to the respective brake shoes near the upper ends 14b thereof. All of the above described mechanism is of usual construction and operates in the usual manner, springs 16 and 17 being used to hold the brake shoes in contracted or inoperative positions and member 15 being operable to move said brake shoes against the influence of said springs into braking engagement with the rim 10.

My adjusting mechanism is arranged in a box or housing 18 which is fixed in position on flange 11 between the ends 14b of brake shoes 14 by means of bolts 19.

These bolts are passed through openings already formed in flange 11 and are screw-seated in apertures 20 in box 18. Since my adjusting mechanism is to be used on automobiles already in use, the present adjusting brackets furnished with the car are removed from plate 11 and the box 18 is installed in its place, the openings 20 being spaced to coincide with the apertures formed in the plate 11.

This box 18 is formed with a chamber 21 which opens on the inner side or that side placed against the plate 11, as indicated at 22. This opening coincides with an opening 24 formed in said plate 11. If desired, a flange 23 can be formed on box 18 to extend outwardly and fit into the opening 24. A plate or cap 25 is held in position on flange 11 by one of the bolts 19 and is used to close said opening 24 and chamber 21.

The front and rear walls 18a and 18b, respectively, of housing 18 are each extended or thickened and formed with a longitudinally disposed bore 26. Slidably arranged in the bore of the forward end 18a is a sleeve 27. The outer or forward end of this sleeve is enlarged, as indicated at 27a, and is formed with a pair of spaced vertically and longitudinally disposed ears 28. The head 27a forms a stop and limits the inward movement of sleeve 27. A pin 29 is slidably arranged in sleeve 27 and the outer end of this pin terminates in a head 30 operating between ears 28. This head is formed with a vertically disposed slot 31 which receives the end 14b of the secondary brake shoe 14. Head 30 is formed with flat sides 30a which bear against ears 28 and thus prevent the rotative movement of sleeve 27, the pin 29 being held against rotative movement by its engagement with the secondary brake shoe 14.

The pin 29 extends about one-half the distance of sleeve 27. The outer or inner half of the bore of said sleeve is screw-threaded and receives the right hand screw 32. The end of this screw is formed V-shaped in cross section, as indicated at 34, and engages one of a plurality of V-shaped grooves 35 formed diametrically in the corresponding end of pin 29 (see Figs. 6 and 7).

Screw 32 extends into chamber 21 and terminates in a hexagonal head 36. The face of this head is formed with an axially disposed bore 36a and a plurality of radially disposed V-shaped grooves 36b (see Fig. 8). A hexagonal head 37 is formed on one end of a screw 38 and the face of this head is formed with an axially projecting pin 37a which is freely received in bore 36a and is also formed with a plurality of V-shaped projections or teeth 37b radially disposed on said face and engaging the V-shaped notches or grooves 36b of head 36. Screw 38 has a lefthand screw thread and is screw-seated in a bore 39 formed in the inner end of a pin or brake shoe rod 40. The latter is slidably mounted in a bore 41 formed longitudinally in the end wall 18b of housing 18.

The outer end of this pin is formed with a vertically disposed slot 40a which receives the upper end 14b of the primary brake shoe 14.

A coiled spring 42 is connected at one end to the secondary brake shoe 14 and at the other end to box 13. Thus said spring acts on pin 29 and holds it in engagement with screw 32.

The screws 32 and 38 are interlocked or interengaged by means of the V-shaped notches 36b and V-shaped projections 37b. Thus said screws cannot be operated accidentally to disturb their adjusted positions. However, said screws can be operated independently of each other by holding one of the screw threads stationary and actuating the head of the other screw. In doing so the adjusting screws are forced apart against the tension of springs 42 and 17 to allow the V-shaped teeth or projections to ride over the high points between the notches.

To adjust the secondary brake shoe 14, lefthand screw 38 is held stationary by applying a wrench to head 37 thereof, and righthand screw 32 is adjusted by another wrench applied to head 36. To tighten the secondary brake shoe, head 36 is turned upwardly, as indicated at solid arrows, and to loosen said brake shoe, the head 36 is turned downwardly, as indicated by dotted arrows.

To adjust the primary brake shoe 14, righthand screw 32 is held stationary and lefthand screw 38 is turned. To tighten the primary brake shoe, head 37 of screw 38 is turned upwardly, as indicated by solid arrows, and to loosen the primary brake shoe, the head 37 is turned downwardly, as indicated by dotted arrows.

Chamber 21 may be filled with oily waste, as indicated at 43, in order to keep the adjusting mechanism lubricated.

In the modified form shown in Figures 10 to 12, inclusive, a pair of brake shoe adjusting rods 44 and 45 are slidably mounted in the end walls of a housing 46. Adjusting rod 44, which engages the secondary brake shoe, has its inner end 47 formed with an axial bore 48 in which is received a pin 49 projecting from the end 50 of adjusting member 51. The face of end 47 is provided with a plurality of radially disposed V-shaped notches 47a and the face of end 50 is provided with a plurality of radially disposed V-shaped teeth or projections 50a which fit into said notches and hold members 44 and 51 against accidental rotation.

The other end of member 51 is formed with a screw-threaded extension 52 which is screw-seated in a screw-seated bore 53 of rod 45, the latter engaging the primary brake shoe. Thus by turning the adjusting member 51 in proper direction the rods 44 and 45 can be extended or retracted to tighten or release the brake shoes. Member 51 is provided with a hexagonal head 51a to permit engagement thereof by a wrench.

The inner end of rod 45 is formed with an external screw thread for receiving a stop nut 54 and a lock nut 55. The nut 54 bears against the rear end wall of the housing and limits the rearward movement of the adjusting mechanism, the tension of the spring 42 urging said parts in this direction.

In the form shown in Figures 13 and 14 a pair of adjusting rods 56 and 57 is slidably mounted in the end walls of a housing 58. The inner end of the front rod 56 is provided with a longitudinal bore 59 in which is loosely disposed a pin 60 of an adjusting member 61. This member has a hexagonal head 62. The opposite end of member 61 has a screw extension 63 engaging a screw-threaded bore 64 formed in the inner end of rear rod 57. Thus by turning the head 62 in proper direction rods 56 and 57 can be moved outwardly or inwardly. A spring member 65, in the form of a thin steel rod, extends transversely and vertically through the housing and has its ends secured in the top and bottom walls thereof. This member bears against one of the flat faces of the head 62 and holds the adjusting member against accidental rotative movement and at the same time permitting movement of said member by a suitable tool. The outer end of rod 56 is provided with an external screw thread, as indicated at 56a, and receives a stop nut 66 and a lock nut 67. Stop nut 66 bears against the front end wall and limits the rearward movement of the adjusting mechanism.

In order to prevent wear of the heads and rods, such as 30 and 40, respectively, at points of engagement with the ends 14b of the brake shoes, I provide replaceable washers 68 at said points. Each of these washers is adapted to be slipped over the respective head or rod. Each washer 68 is provided with a diametrically disposed portion 69 which is adapted to enter the slot 31 of head 30 or slot 40a of rod 40, as the case may be, and form a bearing surface for the end 14b of the respective brake shoe. Thus the bottoms of slots 31 and 40a are thereby protected against wear. As the portions 69 wear out, the washers 68 can be easily and economically replaced. Furthermore, washers 68 can be made of various thicknesses to suit the conditions. These washers 68 can be used equally as well with the modified forms shown in Figures 10 and 13.

To adjust the brake shoe of the form shown in Figures 1 to 9, each screw is moved away from each other, so as to bring the brake shoes tightly against the drum. Then the wrench is brought into engagement with the heads of both screws, and the wrench is moved downward, as indicated by dotted arrows in Figures 8 and 9. Thus both brake shoes are moved simultaneously inward so as to obtain proper operating clearance between the brake shoe and the drum.

When the brake mechanism is actuated, the brake shoes are applied to the drum by the operation of members 15, the brake shoes being moved outward toward the drum and against the influence of springs 16 and 17. Upon the release of the brake mechanism, the brake shoes are contracted or moved away from the drum by the action of said springs. As the drum rolls forward, as indicated by arrow in Figure 1, during the forward movement of the vehicle, there is a tendency upon the release of the brake mechanism to move the primary shoe away from the drum, while in the case of the secondary shoe there is a tendency to retain said shoe in engagement with the drum. The auxiliary spring 42 connected at one end to the secondary brake shoe and at the other to the casing 18 has the tendency to pull said secondary brake shoe inward and away from the drum.

I claim:

1. A brake shoe adjusting mechanism comprising a housing, a pair of horizontally disposed brake shoe pins slidably mounted in said housing in opposed relation to each other and having their outer ends adapted to engage the corresponding ends of a pair of brake shoes, a screw member interposed between and having its ends engaging the inner ends of said pins and operable to adjust said pins inward and outward relatively to said brake shoes, said screw member having a polygonal head, and a pin secured at its ends to said housing and extending at right angle to said head and in contact with one of the sides thereof for locking said screw member against accidental rotation and permit manual rotation of said head against the tension of said pin.

2. A brake shoe adjusting mechanism comprising a housing, a pair of horizontally disposed brake shoe pins slidably mounted in said housing in opposed relation to each other and having their outer ends slotted adapted to engage the corresponding ends of a pair of brake shoes, a screw member interposed between the inner ends of said pins and operable to adjust said pins inward and outward relatively to said brake shoes, and a replaceable washer arranged on the slotted end of each pin and having a diametrical portion disposed in the slot of the pin to provide a bearing surface for the end of each corresponding brake shoe.

3. A brake shoe adjusting mechanism comprising a housing, a pair of horizontally disposed brake shoe pins slidably mounted in said housing in opposed relation to each other and having their outer ends slotted adapted to engage the corresponding ends of a pair of brake shoes, a screw member interposed between the inner ends of said pins and operable to adjust said pins inward and outward relatively to said brake shoes, and a washer arranged on the outer end of each pin and having a diametrical portion engaging the slot thereof to provide a bearing surface for the corresponding brake shoe whereby said pin is protected against wear and said washer can be replaced when worn.

4. A brake shoe adjusting mechanism comprising a housing, a pair of horizontally disposed and axially aligned pins slidably mounted in the end walls of said housing and having their outer ends adapted to engage the corresponding ends of a pair of brake shoes, and a pair of screws screw-seated in the inner ends of said pins and having their heads normally interlocked to prevent independent rotation, said screws being operable manually independently of each other.

5. A brake mechanism comprising a housing, a pair of horizontally disposed coaxial pins slidably mounted in said housing and having their outer ends adapted to engage the corresponding ends of a pair of brake shoes, each of said pins having its inner end internally screw-threaded, a screw screw-seated in the inner end of each pin, the heads of said screws abutting each other, one of said heads being formed with a horizontal bore and the other head with a projecting pin revolubly seated in said bore, and means for interlocking said heads to prevent accidental rotation of one screw relatively to the other.

6. A brake shoe adjusting mechanism comprising a housing having spaced end walls, a pair of horizontally and coaxially disposed pins slidably mounted in said end walls, a head slidably mounted in one of said pins and having a bifurcated outer end for engaging the free end of a brake shoe, a pair of opposed screws screw-seated in the inner ends of said pins, one of said screws bearing against the inner end of said head for adjusting the latter longitudinally relatively to its pin.

7. A brake shoe adjusting mechanism comprising a housing, a pair of horizontally and coaxially disposed pins slidably mounted in the respective end walls of said housing, bifurcated means at the outer end of each pin for engaging the upper ends of a pair of brake shoes, a wear member removably arranged on each bifurcated means to receive the wear from said brake shoe ends, a pair of opposed screws screw-seated in the inner ends of said pins and having their heads in cooperating relation with each other, whereby said screws can be manually actuated independently or cojointly to adjust said brake shoes.

8. A brake shoe adjusting mechanism comprising a housing, a pair of horizontally and coaxially disposed pins slidably mounted in the respective end walls of said housing, bifurcated means at the outer end of each pin for engaging the upper ends of a pair of brake shoes, a wear member removably arranged on each bifurcated means to receive the wear from said brake shoe ends, a pair of opposed screws screw-seated in the inner ends of said pins and having their heads in cooperating relation with each other, whereby said screws can be manually actuated independently or cojointly to adjust said brake shoes, and means cooperating with the heads of said screws for preventing accidental rotation of the latter.

9. An adjusting brake shoe mechanism comprising a housing open at one side, a pair of horizontally and coaxially disposed pins slidably mounted in the respective end walls thereof, the inner end of each screw being internally screw-threaded, a pair of opposed screws screw-seated in said pins, the heads of said screws being yieldably interlocked to prevent relative accidental rotation, and permit manual actuation, a detachable cover for said housing for enclosing said screws, and bifurcated means on the outer end of each pin for engaging the upper end of each of a pair of brake shoes.

10. In a brake shoe adjusting mechanism, the combination with a slidable pin having a bifurcated outer end for engaging the free end of a brake shoe, of a washer having a diametrical portion for engaging the slot of said bifurcated end and forming a bearing surface for said brake shoe end.

GEORGE BENDER.